US006877000B2

(12) United States Patent
Gajda et al.

(10) Patent No.: US 6,877,000 B2
(45) Date of Patent: Apr. 5, 2005

(54) TOOL FOR CONVERTING SQL QUERIES INTO PORTABLE ODBC

(75) Inventors: Kimberly Lynn Gajda, Raleigh, NC (US); Bradley Allan Hess, Rockville, MD (US); Robert Tod Thorpe, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 563 days.

(21) Appl. No.: 09/934,887

(22) Filed: Aug. 22, 2001

(65) Prior Publication Data

US 2003/0041052 A1 Feb. 27, 2003

(51) Int. Cl.[7] ............................. G06F 17/30; G06F 7/00
(52) U.S. Cl. .................................. 707/3; 707/4
(58) Field of Search ............................. 707/2, 3, 4, 9, 707/10, 100, 102; 717/162, 147, 114, 163

(56) References Cited

U.S. PATENT DOCUMENTS

| | | | | |
|---|---|---|---|---|
| 5,664,173 A | * | 9/1997 | Fast | 707/4 |
| 5,749,079 A | * | 5/1998 | Yong et al. | 707/100 |
| 5,761,494 A | | 6/1998 | Smedley et al. | 395/604 |
| 6,016,499 A | | 1/2000 | Ferguson | 707/104 |
| 6,052,685 A | | 4/2000 | Eastwick et al. | 707/10 |
| 6,182,029 B1 | * | 1/2001 | Friedman | 704/9 |
| 6,363,391 B1 | * | 3/2002 | Rosensteel, Jr. | 707/102 |
| 6,560,592 B1 | * | 5/2003 | Reid et al. | 707/2 |
| 6,658,429 B2 | * | 12/2003 | Dorsett, Jr. | 707/1 |
| 2002/0087327 A1 | * | 7/2002 | Lee et al. | 704/270.1 |
| 2002/0161801 A1 | * | 10/2002 | Hind et al. | 707/513 |
| 2003/0048673 A1 | * | 3/2003 | Copeland et al. | 717/163 |
| 2004/0015890 A1 | * | 1/2004 | Wong et al. | 717/137 |

OTHER PUBLICATIONS

Fangju Wang, "Parsing, (2001), Grammatically Incomplete" Natural Language Queries to Spatial Databases, pp. 2400–2404.*

Neil Coburn, Per–Ake Larson, T.Patrick Martin, and Jacob Slonim (1993), CORDS Multidatabase Project: Research and Prototype Overview, pp. 767–778.*

Boris Katz, Deniz Yuret, Jimmy Lin, Sue Felshin, Rebecca Schuman, Adnan Ilik, Ali Ibrahim, Philip Osafo–Kwaako (1999), Intergrating Web Resources and Lexicons into a Natural Language Query System, pp. 255–261.*

* cited by examiner

Primary Examiner—Safet Metjahic
Assistant Examiner—Merilyn Nguyen
(74) Attorney, Agent, or Firm—Jeanine S. Ray-Yarletts; Winstead, Sechrest & Minick

(57) ABSTRACT

A method, computer program product and system for converting Structured Query Language (SQL) statements into the Open Database Connectivity (ODBC) standard. The source code of a database application may be parsed to identify one or more keywords. These keywords may be used to identify SQL statements as well as variables that are used to process the SQL statements. Upon identifying the SQL statements, the SQL statements may be evaluated. The SQL statements evaluated may then be matched with particular functions in a function library, i.e., a collection of functions stored in data files. These functions may implement particular ODBC calls thereby enabling SQL statements to be converted into the ODBC standard. A function call, i.e., a call to that function, may be substituted for the corresponding SQL statement. The function call may then be implemented resulting in the execution of the ODBC calls.

27 Claims, 4 Drawing Sheets

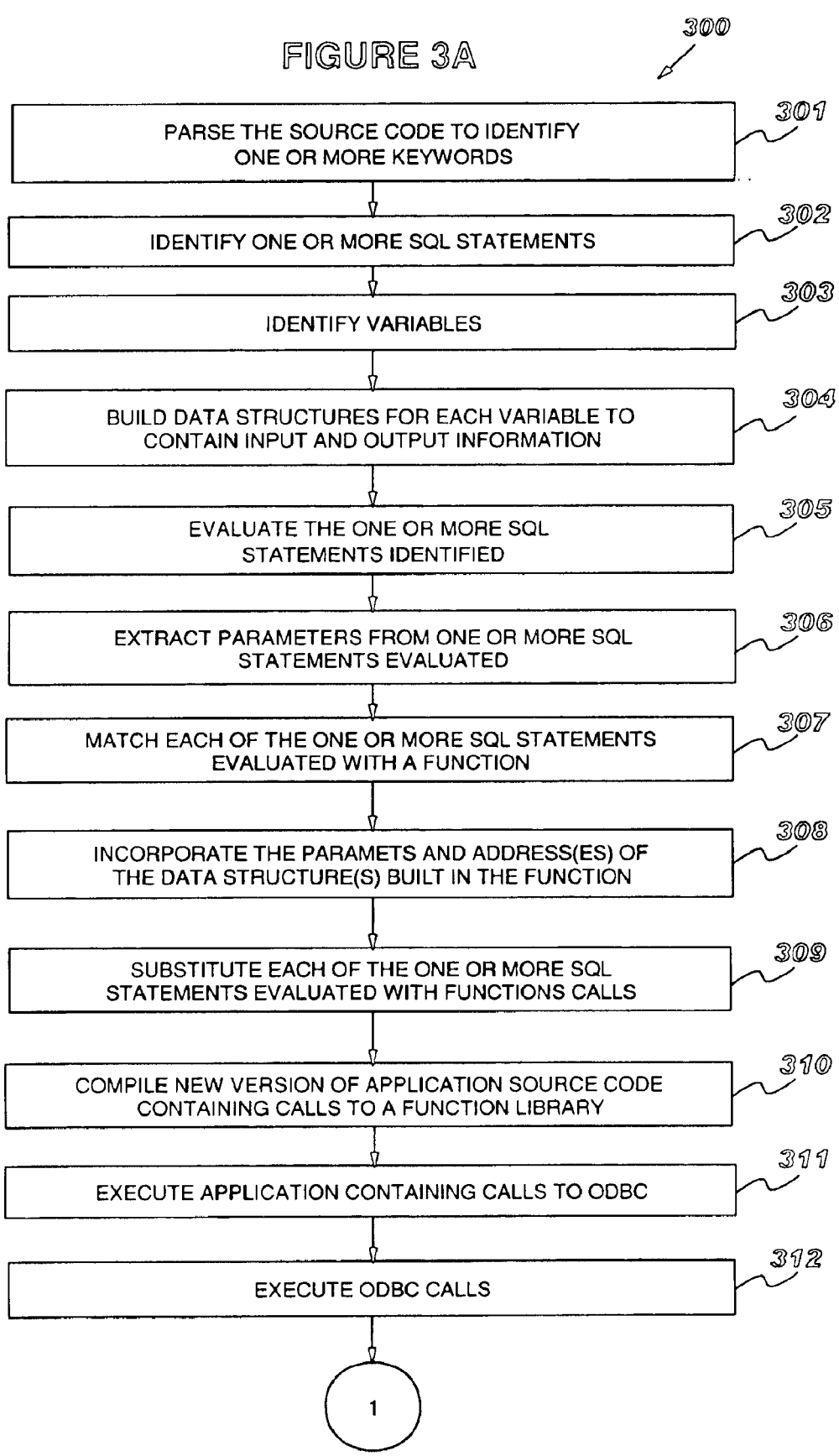

TOOL FOR CONVERTING SQL QUERIES INTO PORTABLE ODBC

TECHNICAL FIELD

The present invention relates to the field of database management systems, and more particularly to converting Structured Query Language (SQL) queries into an Open Database Connectivity (ODBC) standard which is portable across various database management systems.

BACKGROUND INFORMATION

Databases are computerized information storage and retrieval systems. A Relational Database Management System (RDBMS) is a Database Management System (DBMS) which uses relational techniques for storing and retrieving data. Relational databases are organized into tables which consist of rows and columns of data. The rows are formally called tuples. A database will typically have many tables and each table will typically have multiple tuples and multiple columns. The tables are typically stored on random Access Storage Devices (DASD) such as magnetic or optical disk drives for semi-permanent storage.

A DBMS is structured to accept commands to store, retrieve, and delete data. One widely used and well known set of commands is called the Structured Query Language (SQL). The current SQL standard is known informally as SQL/92. The definitions for SQL provide that a DBMS should respond to a particular query with a particular set of data given a specified database content, but the method that the DBMS uses to actually find the required information in the tables on the disk drives is left up to the DBMS. Typically there will be more than one method that can be used by the DBMS to access the required data. The DBMS will optimize the method used to find the data requested in a query in order to minimize the computer time used and, therefore, the cost of doing the query.

A method for accessing data in a DBMS may be to embed SQL statements within an application program, e.g., COBOL, C, C++. Typically, a DBMS may include one or more language specific pre-compilers. A pre-compiler may be configured to process the language program source code including the embedded SQL statements. Processing may include removing SQL statements from the source code, checking the syntax of the SQL statements and inserting calls to private DBMS routines in substitution of the SQL statements. Since each DBMS may include one or more language specific pre-compilers, an application program with embedded SQL statements that is executed on more than one DBMS may have to be pre-compiled using the language specific pre-compiler for each DBMS.

However, an application program using SQL queries may be able to be executed on more than one DBMS without requiring the use of language specific pre-compilers through the use of the Open Database Connectivity (ODBC) standard. The ODBC standard, promulgated by Microsoft™, provides a standard database access Application Programming Interface (API) that is portable across multiple database management systems. Subsequently, an application may utilize the ODBC interface to access data in various DBMSs using SQL. That is, the ODBC interface provides interoperability, where a single application program may access data from different DBMSs. This interoperability may allow an application developer to develop, compile, and ship an application program without targeting a specific DBMS. The ODBC interface is more clearly described in ODBC 2.0 Programmer's Reference and SDK guide, Microsoft Press (1994), which is hereby incorporated herein by reference.

However, not all application programs are ODBC compliant. That is, not all application programs with embedded SQL statements may be able to utilize an ODBC interface to access data in various DBMSs using SQL.

It would therefore be desirable to develop a tool to convert an application that uses embedded SQL API calls to access data in a DBMS to an application that uses ODBC API calls to access data in a DBMS.

SUMMARY

The problems outlined above may at least in part be solved in some embodiments by matching Structured Query Language (SQL) statements with functions storing particular Open Database Connectivity (ODBC) calls in a library thereby converting SQL statements into the ODBC standard.

In one embodiment of the present invention, a method for converting SQL statements into the ODBC standard may comprise the step of parsing the source code of an application comprising embedded SQL calls to identify one or more keywords, e.g., "EXEC SQL SELECT", "EXEC SQL BEGIN DECLARE", "EXEC SQL END DECLARE". The keywords may be used to identify SQL statements, e.g., SELECT<clause>FROM<clause>WHERE<clause>, as well as variables that are used to process the SQL statements. Upon identifying the variables, a data structure associated with each variable may be built. These data structures may be used to store information required to process the SQL statements as well as store the results of processing the SQL statements. Upon identifying the SQL statements, the SQL statements may be evaluated. That is, the particular query requested and the operations to be performed to process the request may be determined.

The parameters in the SQL statements evaluated may be extracted where the parameters comprise data required to process the SQL statements, e.g., data that identifies the tables and columns from which the data is being selected in a SELECT SQL statement. The SQL statements evaluated may then be matched with particular functions in a function library, i.e., a collection of functions stored in data files. For example, the SELECT SQL statement may correspond to a particular function in the function library. These functions may store particular ODBC calls thereby enabling SQL statements to be converted into the ODBC standard.

The parameters extracted from the SQL statements as well as the addresses associated with the data structures built may be incorporated in the matched function. A function call, i.e., a call to that function, may be substituted for the corresponding SQL statement. The new version of the application, i.e., the application source code comprising the substituted function call, may be compiled and executed. Upon executing the new version of the application, the function call may then be implemented resulting in the execution of the ODBC calls. The results from the execution of the ODBC calls may be returned in the appropriate data structures based on the addresses of the data structures incorporated into the function. These results are the same results as if the SQL statements were directly processed instead of converting the SQL statements into the ODBC standard.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which:

FIGS. 3A and 3B is a flowchart of a method for converting Structured Query Language (SQL) queries into an Open Database Connectivity (ODBC) standard.

DETAILED DESCRIPTION

Figure 1:
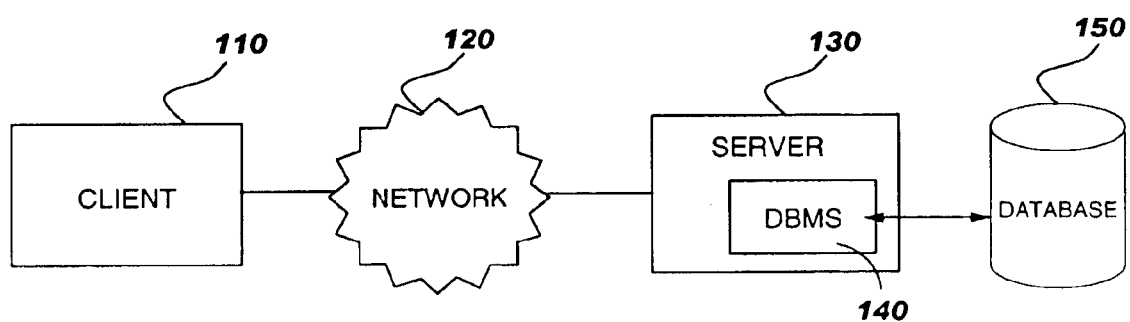
FIG. 1 illustrates an embodiment of a database management system configured in accordance with the present invention.

FIG. 1—Database System

FIG. 1 illustrates one embodiment of the present invention of a database system 100. System 100 may comprise a client 110 coupled to a server 130 via a network 120. Network 120 may be a Local Area Network (LAN), e.g., Ethernet, Token Ring, ARCnet, or a Wide Area Network (WAN), e.g., Internet. Server 130 may comprise a Database Management System (DBMS) 140 configured to use relational techniques for storing and retrieving data from a relational database 150. Relational database 150 may be organized into tables which consists of rows and columns of data where the rows are commonly referred to as tuples. It is noted that database system 100 may comprise any number of clients 110 as well as any number of servers 130 and databases 150 and that FIG. 1 is illustrative. It is further noted that the connection between client 110 and network 120 and between network 120 and server 130 may be any medium type, e.g., wireless, wired. It is further noted that client 110 may be any type of device, e.g., wireless, Personal Digital Assistant (PDA), cell phone, personal computer system, workstation, Internet appliance, configured with the capability of connecting to network 120 and consequently communicating with server 130. It is further noted that database system 100 may be any type of system that has at least one server 130 and at least one client 110 and that FIG. 1 is not to be limited in scope to any one particular embodiment.

A database application of client 110 may issue Structured Query Language (SQL) statements to server 130 that are commands to store, retrieve or delete data stored in relational database 150. These SQL statements may be converted into the ODBC standard as described further hereinbelow in conjunction with FIGS. 3A and 3B. By converting the SQL statements into the ODBC standard, the application may be portable across various database management systems. A detailed description of client 110 is provided below.

Figure 2:
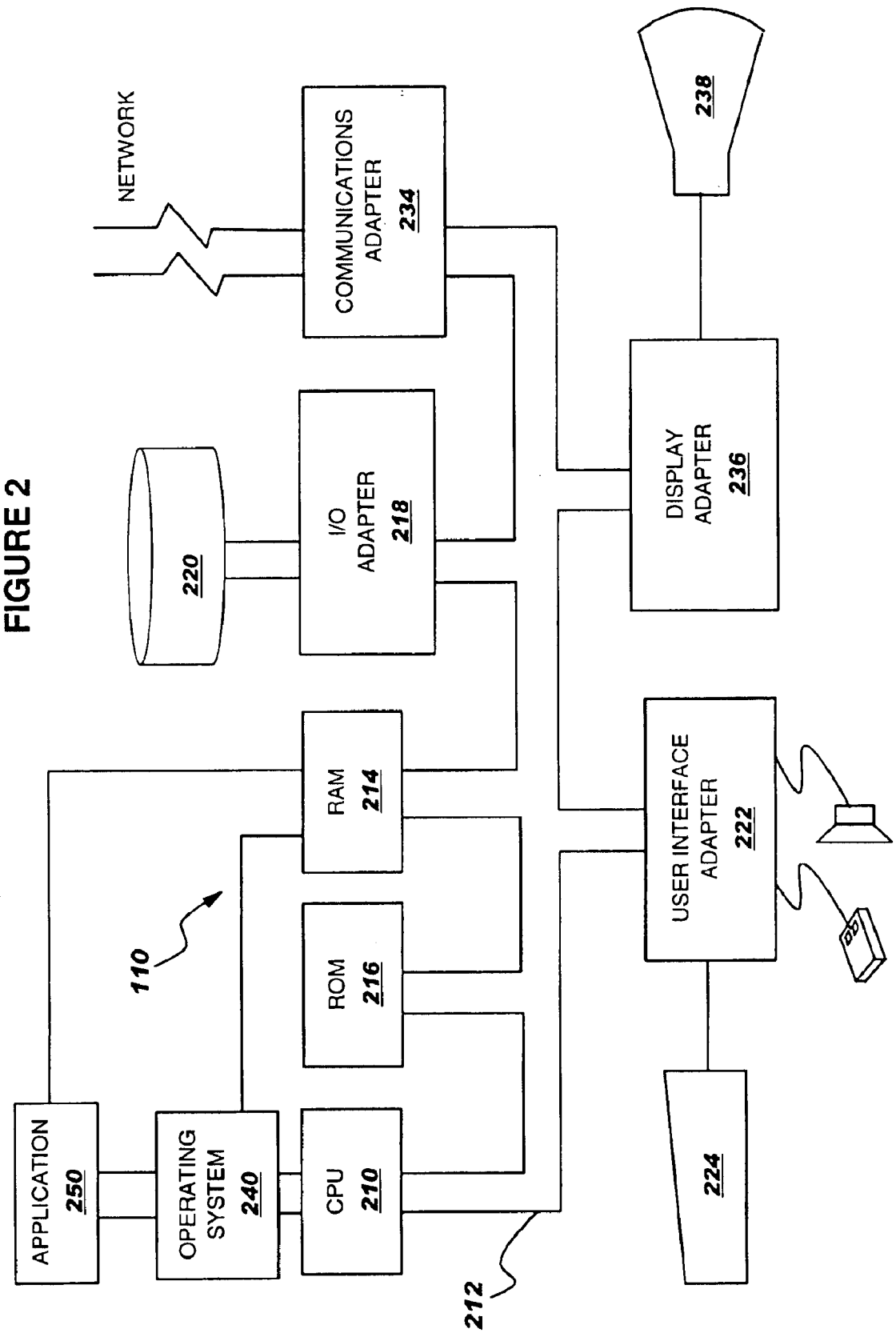
FIG. 2 illustrates an embodiment of a client configured in accordance with the present invention.

FIG. 2—Hardware Configuration of Client

FIG. 2 illustrates a typical hardware configuration of client 110 which is representative of a hardware environment for practicing the present invention. Client 110 has a central processing unit (CPU) 210 coupled to various other components by system bus 212. An operating system 240 runs on CPU 210 and provides control and coordinates the function of the various components of FIG. 2. An application 250 in accordance with the principles of the present invention runs in conjunction with operating system 240 and provides output calls to operating system 240 where the output calls implement the various functions or services to be performed by application 250. Application 250 may include for example, a conversion tool configured to convert SQL statements into the Open Database Connectivity (ODBC) standard as described in FIGS. 3A and 3B. Read only memory (ROM) 216 is coupled to system bus 212 and includes a basic input/output system ("BIOS") that controls certain basic functions of client 110. Random access memory (RAM) 214, I/O adapter 218, and communications adapter 234 are also coupled to system bus 212. It should be noted that software components including operating system 240 and application 250 are loaded into RAM 214 which is the computer system's main memory. I/O adapter 218 may be an integrated drive electronics ("IDE") adapter that communicates with disk unit 220, e.g., disk drive. It is noted that the program of the present invention that converts SQL queries into the ODBC standard, as described in FIGS. 3A and 3B, may reside in disk unit 220 or in application 250.

Communications adapter 234 interconnects bus 212 with an outside network enabling client 110 to communicate with other such systems via a Local Area Network (LAN), e.g., Ethernet, Token Ring, ARCnet, or a Wide Area Network (WAN), e.g., Internet. Input/Output devices are also connected to system bus 212 via a user interface adapter 222 and display adapter 236. Keyboard 224, mouse 226 and speaker 230 are all interconnected to bus 212 through user interface adapter 222. Event data may be input to client 110 through any of these devices. A display monitor 238 is connected to system bus 212 by display adapter 236. In this manner, a user is capable of inputting to client 110 through keyboard 224 or mouse 226 and receiving output from client 110 via display 238 or speaker 230.

Implementations of the invention include implementations as a computer system programmed to execute the method or methods described herein, and as a computer program product. According to the computer system implementation, sets of instructions for executing the method or methods are resident in the random access memory 214 of one or more computer systems configured generally as described above. Until required by the computer system, the set of instructions may be stored as a computer program product in another computer device, for example, in disk drive 220 (which may include a removable memory such as an optical disk or floppy disk for eventual use in the disk drive 220). Further, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change.

Figure 3B:
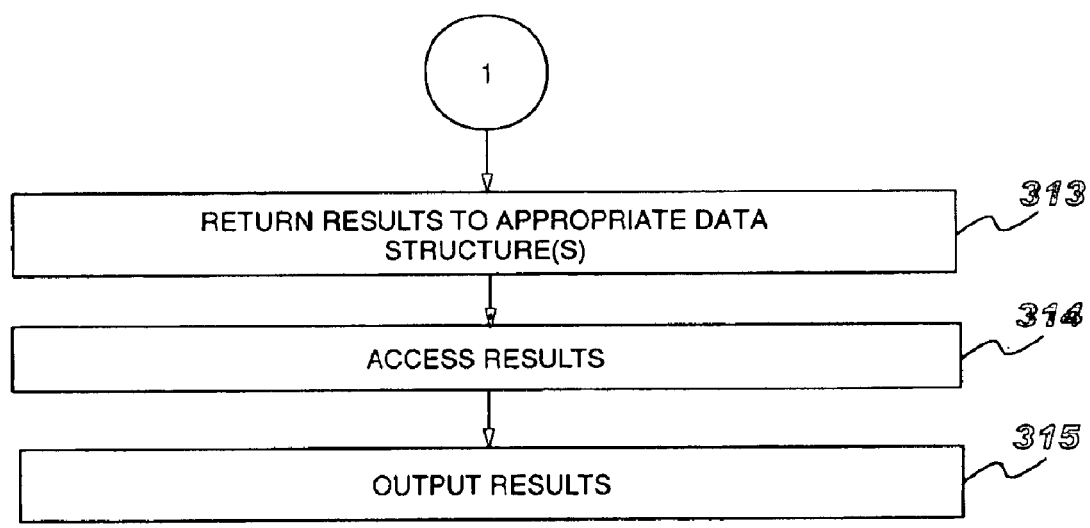

FIGS. 3A and 3B—Method for Converting Structured Query Language (SQL) Queries into an Open Database Connectivity (ODBC) Standard FIGS. 3A and 3B is a flowchart of one embodiment of the present invention of a method 300 for converting SQL queries into an Open Database Connectivity (ODBC) standard. As stated in the Background Information section, the ODBC standard provides a standard database access Application Programming Interface (API) that is portable across multiple Database Management Systems (DBMS). Subsequently, an application may utilize the ODBC interface to access data in various DBMSs using SQL. That is, the ODBC interface provides interoperability, where a single application program may access data from different DBMSs. However, not all applications are ODBC compliant thereby requiring embedded SQL statements within the application source code to be pre-compiled for each DBMS that is to be accessed by the application program. It would therefore be desirable to develop a tool that translates SQL statements embedded in an application into the ODBC standard thereby allowing the application to be portable across various database management systems. Method 300 is a method for translating SQL statements embedded in an application into the ODBC standard thereby allowing the application to be portable across various DBMSs.

In step 301, the program of the present invention may parse the source code of a database application to identify one or more keywords, e.g., "EXEC SQL", "EXEC SQL BEGIN DECLARE", "EXEC SQL END DECLARE". The source code of the database application may comprise one or more keywords that are used to indicate embedded SQL statements. For example, the keywords "EXEC SQL" may signify the beginning of an SQL statement, e.g., SELECT<clause>FROM<clause>WHERE<clause>, comprising an SQL call. The end of the segment may be indicated by a semi-colon. The source code of the database application may comprise one or more keywords that are used to indicate variables that are required to process the SQL statements. For example, the keywords "EXEC SQL BEGIN DECLARE" may indicate the beginning of a list of variables that are used to process the SQL statements. The keywords "EXEC SQL END DECLARE" may indicate the end of the list of variables that are used to process the SQL statements. Each variable may have a data structure associated with it that may be used to store information required to process the SQL statements via ODBC, e.g., employee name=Bobby, as well as store the results of processing the SQL statements, e.g., name, social security number, phone number and address for Bobby, as further described below.

In step 302, upon identifying one or more keywords in step 301, one or more SQL statements may be identified. As stated above, the keywords "EXEC SQL" may signify the beginning of an SQL statement, e.g., SELECT<clause>FROM<clause>WHERE<clause>, where the <clauses> are parameters that provide data required to process the SQL statement as discussed further below. The end of the segment may be indicated by a semi-colon.

In step 303, one or more variables may be identified based on the one or more keywords identified in step 301. As stated above, the keywords "EXEC SQL BEGIN DECLARE" may indicate the beginning of a list of variables that are used to process the SQL statements. The keywords "EXEC SQL END DECLARE" may indicate the end of the list of variables that are used to process the SQL statements. For example, in the source code of the database application shown below EXEC SQL BEGIN DECLARE SECTION;
Char Name [25];
Char SSN [11];
Char Phone [12];
Char Address [30];
EXEC SQL END DECLARE SECTION;
variables "Name", "SSN", "Phone" and "Address" may each be associated with a data structure configured to store information required to process the SQL statements via ODBC as well as store the results of processing the SQL statements, e.g., name, social security number, phone number and address.

In step 304, a data structure associated with each of the variables identified in step 303 may be built. These data structures may be used to store information required to process the SQL statements as well as store the results of processing the SQL statements. For example, referring to the source code of the database application illustrated above, a data structure of the variable "SSN" may be configured to provide the social security number of an employee in order to process an SQL statement. The data structures of the variables "Name", "Phone" and "Address" may store the results of processing an SQL statement such as the name, phone number and address for employees.

In step 305, the SQL statements identified in step 302 may be evaluated. That is, the program may determine the particular query requested and the operations to be performed to process the request. For example, in the SELECT SQL statement, the SELECT <clause> may cause the retrieval of a subset of data from one or more existing tables stored in relational database 150 where the FROM <clause> identifies the table from which data is being selected. The items specified in the SELECT <clause> may determine the columns that will be returned in the result table from the table(s) identified in the FROM <clause>. The WHERE <clause> may then determine which rows should be returned in the result table.

In step 306, the parameters, e.g., <clauses>, from each of the one or more SQL statements evaluated in step 305 may be extracted. That is, the program may extract data required to process the SQL statement. For example, the program may extract the data in the SQL statement that identifies the table from which the query data is being selected in a SELECT SQL statement.

In step 307, the one or more SQL statements evaluated in step 305 may be matched with a particular function stored in a function library, i.e., a collection of functions stored in data files. For example, the SELECT SQL statement may correspond to a particular function in the function library. These functions may store particular ODBC calls thereby enabling SQL statements to be converted into the ODBC standard.

In step 308, the parameters extracted from the one or more SQL statements in step 306 as well as the address(es) of the data structure(s) built in step 304 may be incorporated in the function identified in step 307. For example, the data in the SQL statement that identifies the table from which the query data is being selected in a SELECT SQL statement may be incorporated into the function identified in step 307.

In step 309, a function call, i.e., a call to the function identified in step 307, may be substituted for each of the one or more SQL statements identified in step 302.

In step 310, the new version of the application source code comprising the function calls substituted for each of the one or more SQL statements identified in step 302 may be compiled. In step 311, the compiled new version of the application source code may then be executed.

In step 312, the function call may then be implemented resulting in the execution of ODBC calls. In step 313, the results from the execution of ODBC calls may be returned in the appropriate data structure(s) built in step 304 based on the address(es) of the data structure(s) incorporated into the function identified in step 307. For example, the name, address and phone number of the employee with the SSN of 111-11-1111 may be stored in the data structures name, address, and phone number, respectively. The converted application program returns the same results using ODBC to access the DBMS as the original applications program would using embedded SQL to access the DBMS.

In step 314, the database application may access the results from the appropriate data structure(s). In step 315, the database application may output the results in a variety of forms such as displaying the results on display 238. It is noted that other means of outputting the results would be recognized by an artisan of ordinary skill in the art and that such embodiments employing such means would fall within the scope of the present invention.

It is noted that method 300 may be executed in a different order presented and that the order presented in the discussion of FIGS. 3A and 3B is illustrative. It is further noted that certain steps may be executed almost concurrently.

Although the method, computer program product and system are described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims. It is noted that the headings are used only for organizational purposes and not meant to limit the scope of the description or claims.

What is claimed is:

1. A method for converting Structure Queried Language (SQL) queries into an Open Database Connectivity (ODBC) standard comprising the steps of:

parsing a source code to identify one or more keywords;

identifying an SQL statement based on said one or more keywords;

matching said SQL statement with a function, wherein said function is associated with one or more ODBC calls; and substituting said SQL statement with a call to said function.

2. The method as recited in claim 1 further comprising the steps of:

identifying one or more variables based on said one or more keywords; and building a data structure for each of said one or more variables.

3. The method as recited in claim 2 further comprising the step of:

extracting parameters from said SQL statement, wherein said parameters are data required to process said SQL statement.

4. The method as recited in claim 3 further comprising the step of:

incorporating said parameters and address of each of said data structure built in said function.

5. The method as recited in claim 1 further comprising the step of:

evaluating said SQL statement, wherein said function is matched with said SQL statement upon evaluating said SQL statement.

6. The method as recited in claim 2, wherein said data structure stores at least one of information required to process said SQL statement and a result of processing said SQL statement.

7. The method as recited in claim 1 further comprising the steps of:

compiling said source code with said call to said function substituted for said SQL statement;

executing said compiled source code; and executing said one or more ODBC calls associated with said function.

8. The method as recited in claim 7, wherein said SQL statement requests a particular query, wherein the method further comprises the step of:

returning a result of said particular query in response to said one or more ODBC calls.

9. The method as recited in claim 8 further comprising the step of:

outputting said result.

10. A computer program product having a computer readable medium having computer program logic recorded thereon for converting Structure Queried Language (SQL) queries into an Open Database Connectivity (ODBC) standard, comprising:

programming operable for parsing a source code to identify one or more keywords;

programming operable for identifying an SQL statement based on said one or more keywords;

programming operable for matching said SQL statement with a function, wherein said function is associated with one or more ODBC calls; and programming operable for substituting said SQL statement with a call to said function.

11. The computer program product as recited in claim 10 further comprising:

programming operable for identifying one or more variables based on said one or more keywords; and programming operable for building a data structure for each of said one or more variables.

12. The computer program product as recited in claim 11 further comprising:

programming operable for extracting parameters from said SQL statement, wherein said parameters are data required to process said SQL statement.

13. The computer program product as recited in claim 12 further comprising:

programming operable for incorporating said parameters and address of each of said data structure built in said function.

14. The computer program product as recited in claim 10 further comprising:

programming operable for evaluating said SQL statement, wherein said function is matched with said SQL statement upon evaluating said SQL statement.

15. The computer program product as recited in claim 11, wherein said data structure stores at least one of information required to process said SQL statement and a result of processing said SQL statement.

16. The computer program product as recited in claim 10 further comprising:

programming operable for compiling said source code with said call to said function substituted for said SQL statement;

programming operable for executing said compiled source code; and programming operable for executing said one or more ODBC calls associated with said function.

17. The computer program product as recited in claim 16, wherein said SQL statement requests a particular query, wherein the computer program product further comprises:

programming operable for returning a result of said particular query in response to said one or more ODBC calls.

18. The computer program product as recited in claim 17 further comprising:

programming operable for outputting said result.

19. A system, comprising:

a processor;

a memory unit operable for storing a computer program operable for converting Structure Queried Language (SQL) queries into an Open Database Connectivity (ODBC) standard;

an input mechanism;

an output mechanism; and a bus system coupling the processor to the memory unit, input mechanism, and output mechanism, wherein the computer program is operable for performing the programming steps:

parsing a source code to identify one or more keywords;

identifying an SQL statement based on said one or more keywords;

matching said SQL statement with a function, wherein said function is associated with one or more ODBC calls; and substituting said SQL statement with a call to said function.

20. The system as recited in claim 19, wherein the computer program is further operable to perform the following programming steps:

identifying one or more variables based on said one or more keywords; and building a data structure for each of said one or more variables.

21. The system as recited in claim 20, wherein the computer program is further operable to perform the following programming step:

extracting parameters from said SQL statement, wherein said parameters are data required to process said SQL statement.

22. The system as recited in claim 21, wherein the computer program is further operable to perform the following programming step:

incorporating said parameters and address of each of said data structure built in said function.

23. The system as recited in claim 19, wherein the computer program is further operable to perform the following programming step:

evaluating said SQL statement, wherein said function is matched with said SQL statement upon evaluating said SQL statement.

24. The system as recited in claim 20, wherein said data structure stores at least one of information required to process said SQL statement and a result of processing said SQL statement.

25. The system as recited in claim 19, wherein the computer program is further operable to perform the programming steps:

compiling said source code with said call to said function substituted for said SQL statement;

executing said compiled source code; and executing said one or more ODBC calls associated with said function.

26. The system as recited in claim 25, wherein said SQL statement requests a particular query, wherein the computer program is further operable to perform the programming step:

returning a result of said particular query in response to said one or more ODBC calls.

27. The system as recited in claim 26, wherein the computer program is further operable to perform the programming step:

outputting said result.

* * * * *